(12) United States Patent
Zhang et al.

(10) Patent No.: US 11,184,864 B2
(45) Date of Patent: Nov. 23, 2021

(54) METHOD FOR WIRELESS COMMUNICATION, TERMINAL DEVICE, NETWORK DEVICE, AND NETWORK NODE

(71) Applicant: GUANGDONG OPPO MOBILE TELECOMMUNICATIONS CORP., LTD., Guangdong (CN)

(72) Inventors: Zhi Zhang, Dongguan (CN); Wenhong Chen, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 27 days.

(21) Appl. No.: 16/623,317

(22) PCT Filed: Sep. 8, 2017

(86) PCT No.: PCT/CN2017/101139
§ 371 (c)(1),
(2) Date: Dec. 16, 2019

(87) PCT Pub. No.: WO2019/028962
PCT Pub. Date: Feb. 14, 2019

(65) Prior Publication Data
US 2020/0213954 A1 Jul. 2, 2020

(30) Foreign Application Priority Data

Aug. 11, 2017 (WO) ................ PCT/CN2017/097028

(51) Int. Cl.
*H04W 72/14* (2009.01)
*H04W 52/36* (2009.01)
(Continued)

(52) U.S. Cl.
CPC ....... *H04W 52/365* (2013.01); *H04W 52/146* (2013.01); *H04W 52/42* (2013.01); *H04W 72/042* (2013.01)

(58) Field of Classification Search
CPC . H04W 52/365; H04W 72/14; H04W 52/367; H04W 72/0426; H04B 7/0626; H04B 7/0413; H04B 7/0452
See application file for complete search history.

(56) References Cited

U.S. PATENT DOCUMENTS

| 8,249,091 B2 | 8/2012 | Soeng-Hun |
| 9,419,768 B2 | 8/2016 | Dongcheol |

(Continued)

FOREIGN PATENT DOCUMENTS

| CN | 101931992 A | 12/2010 |
| CN | 102123437 A | 7/2011 |

(Continued)

OTHER PUBLICATIONS

AT&T. "On the details of multi-TRP and multi-panel transmission", 3GPP TSG RAN WG1 NR Ad-Hoc#2, R1-1710428 Qingdao, P.R. China Jun. 27-30, 2017.

(Continued)

*Primary Examiner* — Tu X Nguyen
(74) *Attorney, Agent, or Firm* — Ladas & Parry, LLP (57) ABSTRACT

A method for wireless communication, a terminal device, a network device and a network node are provided, which may implement reasonable configuration or scheduling of a terminal device by a network node or device. The method includes that: a terminal device calculates at least one PHR to be reported to a first network node according to a transmission channel on a first uplink between the terminal device and the first network node, the first network node and a second network node serving the terminal device; and the (Continued)

Terminal device terminal device reports the calculated at least one PHR to the first network node through the first uplink.

13 Claims, 6 Drawing Sheets

(51) Int. Cl.
*H04W 52/14* (2009.01)
*H04W 52/42* (2009.01)
*H04W 72/04* (2009.01)

(56) References Cited

U.S. PATENT DOCUMENTS

| | | | |
|---|---|---|---|
| 9,432,956 | B2 | 8/2016 | Soeng-Hun |
| 9,525,526 | B2 | 12/2016 | Claudio |
| 9,730,169 | B2 | 8/2017 | Kim et al. |
| 9,736,714 | B2 | 8/2017 | Yali |
| 2011/0092217 | A1 | 4/2011 | Soeng-Hun |
| 2012/0044882 | A1 | 2/2012 | Dongcheol |
| 2012/0281633 | A1 | 11/2012 | Soeng-Hun |
| 2012/0300703 | A1 | 11/2012 | Man |
| 2013/0064131 | A1* | 3/2013 | Kwon .............. H04L 5/0007 370/252 |
| 2013/0336228 | A1 | 12/2013 | Yali |
| 2014/0348105 | A1 | 11/2014 | Claudio |
| 2015/0195796 | A1 | 7/2015 | Sivanesan |
| 2015/0271811 | A1 | 9/2015 | Kim et al. |
| 2015/0327186 | A1 | 11/2015 | Oketani |
| 2016/0021624 | A1 | 1/2016 | Feuersaenger et al. |
| 2016/0183290 | A1 | 6/2016 | Ko et al. |
| 2016/0374032 | A1 | 12/2016 | Kim et al. |
| 2017/0006559 | A1 | 1/2017 | Kim et al. |
| 2017/0359787 | A1 | 12/2017 | Kim et al. |
| 2018/0279339 | A1* | 9/2018 | Lohr .............. H04W 52/34 |

FOREIGN PATENT DOCUMENTS

| | | |
|---|---|---|
| CN | 102457351 A | 5/2012 |
| CN | 102577488 A | 7/2012 |
| CN | 104106299 A | 10/2014 |
| CN | 101931992 B | 12/2014 |
| CN | 104936278 A | 9/2015 |
| CN | 104956748 A | 9/2015 |
| CN | 105357682 A | 2/2016 |
| JP | 2016066968 A | 4/2016 |
| JP | 2017503391 A | 1/2017 |
| RU | 2627306 C1 | 8/2017 |
| WO | 2012023688 A1 | 2/2012 |
| WO | 2015035572 A1 | 3/2015 |

OTHER PUBLICATIONS

Ericsson. "DL multi-TRP and multi-panel transmission", 3GPP TSG-RAN WG1 #89ah-NR, R1-1711013 Qingdao, China, Jun. 27-30, 2017.
Nokia, Alcatel-Lucent Shanghai Bell. "On the maximum number of PDCCHs/PDSCHs to be supported for multi-TRP transmission", 3GPP TSG RAN1-NR#2 Ad Hoc, R1-1711288 Qingdao, P.R. China, Jun. 27-30, 2017.
First Office Action of the Russian application No. 2020100196, dated Sep. 24, 2020.
International Search Report in the international application No. PCT/CN2017/101139, dated May 2, 2018.
Written Opinion of the International Search Authority in the international application No. PCT/CN2017/101139, dated May 2, 2018.
International Search Report in the international application No. PCT/CN2017/097028, dated Mar. 30, 2018.
Written Opinion of the International Search Authority in the international application No. PCT/CN2017/097028, dated Mar. 30, 2018.
"Extended PHR considering beam and TRxP change", 3GPP Draft; R2-1707360 Extended PHR Considering Beam and TRXP Change, 3rd Generation Partnership Project (3GPP), Mobile Competence Centre ; 650, Route Des Lucioles ; F-06921 Sophia-Antipolis Cedex ; F, vol. RAN WG2, no. Qingdao, China; Jun. 27, 2017-Jun. 29, 2017 Jun. 26, 2017 (Jun. 26, 2017), XP051301848, Retrieved from the Internet: URL:http://www.3gpp.org/ftp/Meetings_3GPP_SYNC/RAN2/Docs/ [retrieved on Jun. 26, 2017].
SAMSUNG: "On PHR Requirements and Calculation", 3GPP Draft; R1-1710766, 3rd Generation Partnership Project (3GPP), Mobile Competence Centre ; 650, Route Des Lucioles ; F-06921 Sophia-Antipolis Cedex ; France, vol. RAN WG1, no. Qingdao, China; Jun. 26, 2017-Jun. 30, 2017 Jun. 16, 2017 (Jun. 16, 2017), XP051304375, Retrieved from the Internet: URL:http://www.3gpp.org/ftp/tsg_ran/WG1_RL1/TSGR1_AH/NR_AH_1706/Docs/ [retrieved on Jun. 16, 2017].
Samsung: "NSA PHR for EN-DC", 3GPP Draft; R2-1707353 NR PHR for EN-DC, 3rd Generation Partnership Project (3GPP), Mobile Competence Centre ; 650, Route Des Lucioles ; F-06921 Sophia-Antipolis Cedex ; France, vol. RAN WG2, no. Qingdao, China; Jun. 27, 2017-Jun. 29, 2017 Jun. 17, 2017 (Jun. 17, 2017), XP051307382, Retrieved from the Internet: URL:http://www.3gpp.org/ftp/tsg_ran/WG2_RL2/TSGR2_AHs/2017_06_NR/Docs/ [retrieved on Jun. 17, 2017].
Huawei et al.: "Discussion on Multi-TRP cooperation for URLLC", 3GPP Draft; R1 -1710468, 3rd Generation Partnership Project (3GPP), Mobile Competence Centre ; 650, Route Des Lucioles ; F-06921 Sophia-Antipolis Cedex ; France, vol. RAN WG1, no. Qingdao, China; Jun. 27, 2017-Jun. 30, 2017 Jun. 17, 2017 (Jun. 17, 2017), XP051305066, Retrieved from the Internet: URL:http://www.3gpp.org/ftp/tsg_ran/WG1_RL1/TSGR1_AH/NR_AH_1706/Docs/ [retrieved on Jun. 17, 2017].
Supplementary European Search Report in the European application No. 17920761.8, dated Mar. 19, 2020.
English translation of the Written Opinion of the International Search Authority in the international application No. PCT/CN2017/101139, dated May 2, 2018.
English translation of the Written Opinion of the International Search Authority in the international application No. PCT/CN2017/097028, dated Mar. 30, 2018.
First Office Action of the Canadian application No. 3066672, dated Feb. 8, 2021.
Office Action of the Indian application No. 201917051504, dated Mar. 24, 2021.
Written Opinion of the Singaporean application No. 11201912256P, dated Aug. 6, 2021, all pages.
Huawei, HiSilicon, Consideration on LTE-NR co-existence [online], 3GPP TSG RAN WG2 # 97bis R2-1703663, Apr. 7, 2017, all pages.
ZTE, Physical Layer Functionalities for Dual Connectivity [online], 3GPP TSG-RAN WG1#76b R1-141401, Apr. 4, 2014, all pages.
First Office Action of the Japanese application No. 2020-500697, dated Aug. 13, 2021, all pages.

* cited by examiner

A terminal device calculates at least one PHR to be reported to a network side based on an uplink transmission channel, for which a first carrier is adopted for communication, of the terminal device, the terminal device being capable of performing uplink transmission by use of the first carrier and a second carrier respectively — 810

The terminal device reports the calculated at least one PHR to the network side through the first carrier — 820

A network device receives at least one PHR from a terminal device, the at least one PHR being calculated by the terminal device based on an uplink transmission channel, for which a first carrier is adopted for communication, of the terminal device and the terminal device performing uplink transmission by use of the first carrier and a second carrier respectively — 910

The network device configures or schedules the terminal device based on the at least one PHR — 920

METHOD FOR WIRELESS COMMUNICATION, TERMINAL DEVICE, NETWORK DEVICE, AND NETWORK NODE

CROSS-REFERENCE TO RELATED APPLICATIONS

The application is a national phase application of International Patent Application No. PCT/CN2017/101139, filed on Sep. 8, 2017, and claims priority to International Application No. PCT/CN2017/097028, filed on Aug. 11, 2017, the contents of which are hereby incorporated by reference in their entireties.

TECHNICAL FIELD

Embodiments of the application relate to the field of communications, and more particularly to a method for wireless communication, a terminal device, a network device and a network node.

BACKGROUND

In wireless communications, a terminal device may be configured or scheduled by multiple network nodes, or a network device may configure or schedule a terminal device for multiple services.

In a future wireless communication, the process of wireless transmission may be more complex, and a requirement on performance of a communication system may be higher.

Therefore, how to reasonably configure or schedule a terminal device by a network node or network device is an urgent problem to be solved.

SUMMARY

A method and device for wireless communication are provided, which may implement reasonable configuration or scheduling of a terminal device by a network node or device.

A first aspect provides a method for wireless communication, which may include the following operations that:

a terminal device calculates at least one Power Headroom Report (PHR) to be reported to a first network node according to a transmission channel on a first uplink between the terminal device and the first network node, the terminal device being served by the first network node and a second network node: and the terminal device reports the calculated at least one PHR to the first network node through the first uplink.

Based on the first aspect, in a possible implementation mode of the first aspect, the operation that the terminal device calculates the at least one PHR to be reported to the first network node based on the transmission channel on the first uplink between the terminal device and the first network node may include that:

a first PHR is calculated by use of the transmission channel on the first uplink without considering a transmission channel on a second uplink between the terminal device and the second network node; and the at least one PHR reported to the first network node may include the first PHR.

Based on the first aspect or any abovementioned possible implementation mode, in another possible implementation mode of the first aspect, the method may further include that:

the terminal device reports the calculated first PHR to the second network node through a second uplink.

Based on the first aspect or any abovementioned possible implementation mode, in another possible implementation mode of the first aspect, the operation that the terminal device calculates the at least one PHR to be reported to the first network node according to the transmission channel on the first uplink between the terminal device and the first network node may include that:

a second PHR is calculated by use of the transmission channel on the first uplink and based on a transmission channel on a second uplink between the terminal device and the second network node;

the at least one PHR reported to the first network node may include the second PHR.

Based on the first aspect or any abovementioned possible implementation mode, in another possible implementation mode of the first aspect, the method may further include that:

the terminal device reports the calculated second PHR to the second network node through the second uplink.

Based on the first aspect or any abovementioned possible implementation mode, in another possible implementation mode of the first aspect, the method may further include that:

a third PHR is calculated by use of a transmission channel on a second uplink without considering the transmission channel on the first uplink between the terminal device and the first network node;

the terminal device reports the calculated third PHR to the second network node through the second uplink, or the terminal device reports the calculated third PHR to the first network node through the first uplink.

Based on the first aspect or any abovementioned possible implementation mode, in another possible implementation mode of the first aspect, the method may further include that:

the terminal device receives Physical Downlink Control Channels (PDCCHs) or Physical Downlink Shared Channels (PDSCHs) simultaneously transmitted to the first terminal device by the first network node and the second network node.

Based on the first aspect or any abovementioned possible implementation mode, in another possible implementation mode of the first aspect, the first network node and the second network node may simultaneously transmit the PDCCHs or the PDSCHs to the first terminal device through carriers which at least partially overlap in a frequency domain.

Based on the first aspect or any abovementioned possible implementation mode, in another possible implementation mode of the first aspect, the first network node and the second network node may perform downlink transmission to the first terminal device through different transmission beams and/or different antenna panels.

Based on the first aspect or any abovementioned possible implementation mode, in another possible implementation mode of the first aspect, the first network node and the second network node may belong to a same cell; or, the first network node and the second network node may belong to different cells.

Based on the first aspect or any abovementioned possible implementation mode, in another possible implementation mode of the first aspect, the method may further include that:

the terminal device determines the at least one PHR to be reported to the first network node according to a network configuration or preset information.

Based on the first aspect or any abovementioned possible implementation mode, in another possible implementation mode of the first aspect, the at least one PHR to be reported to the first network node may be associated with a communication quality index of a channel between the first network node and the second network node.

Based on the first aspect or any abovementioned possible implementation mode, in another possible implementation mode of the first aspect, the communication quality index may include link quality and/or delay and/or reliability.

A second aspect provides a method for wireless communication, which may include that:

a terminal device calculates at least one PHR based on uplink transmission of a first service between the terminal device and a network device; and the terminal device reports the at least one PHR to the network device.

Based on the second aspect, in a possible implementation mode of the second aspect, the operation that the terminal device calculates the at least one PHR based on the uplink transmission of the first service between the terminal device and the network device may include that:

the terminal device calculates a first PHR based on the uplink transmission of the first service without considering uplink transmission of a second service;

the at least one PHR reported to the network device by the terminal device may include the first PHR.

Based on the second aspect or any abovementioned possible implementation mode, in another possible implementation mode of the second aspect, the operation that the terminal device calculates the first PHR based on uplink transmission of the first service between the terminal device and the network device may include that:

the terminal device calculates a second PHR based on the uplink transmission of the first service in combination with uplink transmission of the second service;

the at least one PHR reported to the network device by the terminal device may include the second PHR.

Based on the second aspect or any abovementioned possible implementation mode, in another possible implementation mode of the second aspect, the method may further include that:

the terminal device calculates a third PHR based on uplink transmission of the second service without considering the uplink transmission of the first service; and the terminal device reports the third PHR to the network device.

Based on the second aspect or any abovementioned possible implementation mode, in another possible implementation mode of the second aspect, the first service may be an Ultra-Reliable Low Latency Communications (URLLC) service, and the second service may be an Enhance Mobile Broadband (eMBB) service.

A third aspect provides a method for wireless communication, which may include that:

a first network node receives at least one PHR from a terminal device, the at least one PHR being calculated based on a transmission channel on a first uplink between the terminal device and the first network node, and the first network node and a second network node serving the terminal device; and the first network node configures or schedules the terminal device based on the at least one PHR.

Based on the third aspect, in a possible implementation mode of the third aspect, the at least one PHR may include a first PHR calculated by use of the transmission channel on the first uplink without considering a transmission channel on a second uplink between the terminal device and the second network node.

Based on the third aspect or any abovementioned possible implementation mode, in another possible implementation mode of the third aspect, the at least one PHR may include a second PHR, and the second PHR may be calculated by use of the transmission channel on the first uplink in combination with the transmission channel on the second uplink between the terminal device and the second network node.

Based on the third aspect or any abovementioned possible implementation mode, in another possible implementation mode of the third aspect, the method may further include that:

the first network node receives a third PHR from the terminal device, the third PHR being calculated based on the transmission channel on the second uplink between the terminal device and the second network node.

The operation that the first network node configures or schedules the terminal device based on the at least one PHR may include that:

the first network node configures or schedules the terminal device based on the at least one PHR and the third PHR.

A fourth aspect provides a method for wireless communication, which may include that:

a network device receives at least one PHR calculated by a terminal device based on uplink transmission of a first service between the terminal device and the network device; and the network device configures or schedules the terminal device based on the at least one PHR.

Based on the fourth aspect, in a possible implementation mode of the fourth aspect, the at least one PHR may include a first PHR, and the first PHR may be obtained based on the uplink transmission of the first service without considering uplink transmission of a second service.

Based on the fourth aspect or any abovementioned possible implementation mode, in another possible implementation mode of the fourth aspect, the at least one PHR may include a second PHR, and the second PHR may be obtained based on the uplink transmission of the first service and in combination with uplink transmission of the second service.

Based on the fourth aspect or any abovementioned possible implementation mode, in another possible implementation mode of the fourth aspect, the method may further include that:

the network device receives a third PHR calculated by the terminal device based on uplink transmission of the second service between the terminal device and the network device.

The operation that the network device configures or schedules the terminal device based on the at least one PHR may include that:

the network device configures or schedules the terminal device based on the at least one PHR and the third PHR.

Based on the fourth aspect or any abovementioned possible implementation mode, in another possible implementation mode of the fourth aspect, the first service may be a URLLC service, and the second service may be an eMBB service.

A fifth aspect provides a method for wireless communication, which may include that:

a terminal device calculates at least one PHR to be reported to a network side based on an uplink transmission channel, for which a first carrier is adopted for communication, of the terminal device, the terminal device being capable of performing uplink transmission by use of the first carrier and a second carrier respectively; and the terminal device reports the calculated at least one PHR to the network side through the first carrier.

Based on the fifth aspect, in a possible implementation mode of the fifth aspect, the operation that the terminal device calculates the at least one PHR to be reported to the network side based on the uplink transmission channel, for which the first carrier is adopted for communication, of the terminal device may include that:

a first PHR is calculated based on the uplink transmission channel, for which the first carrier is adopted for communication, of the terminal device without considering an uplink transmission channel, for which the second carrier is adopted for communication, of the terminal device;

the at least one PHR reported to the network side may include the first PHR.

Based on the fifth aspect or any abovementioned possible implementation mode, in another possible implementation mode of the fifth aspect, the method may further include that:

the terminal device reports the calculated first PHR to the network side through the second carrier.

Based on the fifth aspect or any abovementioned possible implementation mode, in another possible implementation mode of the fifth aspect, the operation that the terminal device calculates the at least one PHR to be reported to the network side based on the uplink transmission channel, for which the first carrier is adopted for communication, of the terminal device may include that:

a second PHR is calculated based on the uplink transmission channel, for which the first carrier is adopted for communication, of the terminal device and in combination with an uplink transmission channel, for which the second carrier is adopted for communication, of the terminal device;

the at least one PHR reported to the network side may include the second PHR.

Based on the fifth aspect or any abovementioned possible implementation mode, in another possible implementation mode of the fifth aspect, the method may further include that:

the terminal device reports the calculated second PHR to the network side through the second carrier.

Based on the fifth aspect or any abovementioned possible implementation mode, in another possible implementation mode of the fifth aspect, the method may further include that:

a third PHR is calculated based on an uplink transmission channel, for which the second carrier is adopted for communication, of the terminal device without considering the uplink transmission channel, for which the first carrier is adopted for communication, of the terminal device; and the terminal device reports the calculated third PHR to the network side through the second carrier, or the terminal device reports the calculated third PHR to the network side through the first carrier.

Based on the fifth aspect or any abovementioned possible implementation mode, in another possible implementation mode of the fifth aspect, the method may further include that:

the terminal device receives PDCCHs or PDSCHs simultaneously transmitted through the first carrier and the second carrier to the terminal device by the network side.

Based on the fifth aspect or any abovementioned possible implementation mode, in another possible implementation mode of the fifth aspect, the method may further include that:

the terminal device determines the at least one PHR to be reported through the first carrier according to a network configuration or preset information.

Based on the fifth aspect or any abovementioned possible implementation mode, in another possible implementation mode of the fifth aspect, the first carrier may be a carrier in a first carrier group, and the second carrier may be a carrier in a second carrier group that is not the first carrier group.

Based on the fifth aspect or any abovementioned possible implementation mode, in another possible implementation mode of the fifth aspect, the first carrier may be a carrier of a communication system adopting a first communication mode, and the second carrier may be a carrier of a communication system adopting a second communication mode that is not the first communication mode.

Based on the fifth aspect or any abovementioned possible implementation mode, in another possible implementation mode of the fifth aspect, the first communication mode may be a Long Term Evolution (LTE) communication mode, and the second communication mode may be a New Radio (NR) communication mode; or the first communication mode may be an NR communication mode, and the second communication mode may be an LTE communication mode.

Based on the fifth aspect or any abovementioned possible implementation mode, in another possible implementation mode of the fifth aspect, the first carrier and the second carrier may completely or partially overlap in a frequency domain.

A sixth aspect provides a method for wireless communication, which may include that:

a network device receives at least one PHR from a terminal device, the at least one PHR being calculated by the terminal device based on an uplink transmission channel, for which a first carrier is adopted for communication, of the terminal device and the terminal device performing uplink transmission by use of the first carrier and a second carrier respectively; and the network device configures or schedules the terminal device based on the at least one PHR.

Based on the sixth aspect, in a possible implementation mode of the sixth aspect, the at least one PHR may include a first PHR, and the first PHR may be calculated based on the uplink transmission channel, for which the first carrier is adopted for communication, of the terminal device without considering an uplink transmission channel, for which the second carrier is adopted for communication, of the terminal device.

Based on the sixth aspect or any abovementioned possible implementation mode, in another possible implementation mode of the sixth aspect, the at least one PHR may include a second PHR, and the second PHR may be calculated based on the uplink transmission channel, for which the first carrier is adopted for communication, of the terminal device in combination with the uplink transmission channel, for which the second carrier is adopted for communication, of the terminal device.

Based on the sixth aspect or any abovementioned possible implementation mode, in another possible implementation mode of the sixth aspect, the method may further include that:

the network device receives a third PHR from the terminal device, the third PHR being calculated based on an uplink transmission channel, for which the second carrier is adopted for communication, of the terminal device without considering the uplink transmission channel, for which the first carrier is adopted for communication, of the terminal device.

The operation that the network device configures or schedules the terminal device based on the at least one PHR may include that:

the network device configures or schedules the terminal device based on the at least one PHR and the third PHR.

Based on the sixth aspect or any abovementioned possible implementation mode, in another possible implementation mode of the sixth aspect, the first carrier may be a carrier in a first carrier group, and the second carrier may be a carrier in a second carrier group that is not the first carrier group.

Based on the sixth aspect or any abovementioned possible implementation mode, in another possible implementation mode of the sixth aspect, the first carrier may be a carrier of a communication system adopting a first communication mode, and the second carrier may be a carrier of a communication system adopting a second communication mode that is not the first communication mode.

Based on the sixth aspect or any abovementioned possible implementation mode, in another possible implementation mode of the sixth aspect, the first communication mode may be an LTE communication mode, and the second communication mode may be an NR communication mode; or the first communication mode may be the NR communication mode, and the second communication mode may be the LTE communication mode.

Based on the sixth aspect or any abovementioned possible implementation mode, in another possible implementation mode of the sixth aspect, the first carrier and the second carrier may completely or partially overlap in a frequency domain.

A seventh aspect provides a terminal device, which is configured to execute the method in the first aspect or any possible implementation mode of the first aspect or the second aspect or any possible implementation mode of the second aspect or the fifth aspect or any possible implementation mode of the fifth aspect. Specifically, the terminal device includes functional modules configured to execute the method in the first aspect or any possible implementation mode of the first aspect or the second aspect or any possible implementation mode of the second aspect.

An eighth aspect provides a terminal device, which includes a processor, a memory and a transceiver. The processor, the memory and the transceiver communicate with one another through internal connecting paths to transmit control and/or data signals to enable the terminal device to execute the method in the first aspect or any possible implementation mode of the first aspect or the second aspect or any possible implementation mode of the second aspect or the fifth aspect or any possible implementation mode of the fifth aspect.

A ninth aspect provides a network node, which is configured to execute the method in the third aspect or any possible implementation mode of the third aspect. Specifically, the network node includes functional modules configured to execute the method in the third aspect or any possible implementation mode of the third aspect.

A tenth aspect provides a network node, which includes a processor, a memory and a transceiver. The processor, the memory and the transceiver communicate with one another through internal connecting paths to transmit control and/or data signals to enable the network node to execute the method in the third aspect or any possible implementation mode of the third aspect.

An eleventh aspect provides a network device, which is configured to execute the method in the fourth aspect or any possible implementation mode of the fourth aspect or the sixth aspect or any possible implementation mode of the sixth aspect. Specifically, the network device includes functional modules configured to execute the method in the fourth aspect or any possible implementation mode of the fourth aspect or the sixth aspect or any possible implementation mode of the sixth aspect.

A twelfth aspect provides a network device, which includes a processor, a memory and a transceiver. The processor, the memory and the transceiver communicate with one another through an internal connecting path to transmit control and/or data signals to enable the network device to execute the method in the fourth aspect or any possible implementation mode of the fourth aspect or the sixth aspect or any possible implementation mode of the sixth aspect.

A thirteenth aspect provides a computer-readable medium, which is configured to store a computer program, the computer program including an instruction configured to execute any method.

Accordingly, in the embodiments of the application, the terminal device reports a PHR corresponding to at least one link or service or carrier to the network side under the condition that multiple uplinks or multiple services or multiple carriers exist, and then the network side may configure or schedule the terminal device based on the PHR corresponding to the link or the service or the carrier. Therefore, the terminal device may be reasonably configured or scheduled, and system performance may be improved.

DETAILED DESCRIPTION

The technical solutions in the embodiments of the application will be described below based on the drawings.

The technical solutions of the embodiments of the application may be applied to various communication systems, for example, a Global System of Mobile Communication (GSM), a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, LTE Time Division Duplex (TDD), a Universal Mobile Telecommunication System (UMTS), a Worldwide Interoperability for Microwave Access (WiMAX) communication system or a future 5th-Generation (5G) (also be called NR) system.

A network node or network device mentioned in the embodiments of the application may be a device capable of communicating with a terminal device. The network node or the network device may provide communication coverage for a specific geographical region and may communicate with a terminal device (for example, User Equipment (UE)) under the coverage. Optionally, the network node or the network device may be a Base Transceiver Station (BTS) in the GSM or the CDMA system, or may be a NodeB (NB) in the WCDMA system, or may be an Evolutional Node B (eNB or eNodeB) in the LTE system or a wireless controller in a Cloud Radio Access Network (CRAN). Or the network node or the network device may be a relay station, an access point, a different antenna panel of the same base station, a Transmitting-Receiving Point (TRP), a vehicle-mounted device, a wearable device, a network-side device in a future 5G network, a network node or device in a future evolved Public Land Mobile Network (PLMN) or the like.

The terminal device mentioned in the embodiments of the application may be mobile or fixed. Optionally, the terminal device may refer to an access terminal, UE, a user unit, a user station, a mobile station, a mobile radio station, a remote station, a remote terminal, a mobile device, a user terminal, a terminal, a wireless communication device, a user agent or a user device. The access terminal may be a cell phone, a cordless phone, a Session Initiation Protocol (SIP) phone, a Wireless Local Loop (WLL) station, a Personal Digital Assistant (PDA), a handheld device with a wireless communication function, a computing device or other processing devices connected to a wireless modem, a vehicle-mounted device, a wearable device, a terminal device in the future 5G network, a terminal device in the future evolved PLMN or the like.

Optionally, in the embodiments of the application, multiple network nodes may jointly serve the terminal device.

Optionally, multiple network nodes may perform downlink transmission to the terminal device through different beams. For example, a network node 1 and a network node 2 may perform downlink transmission to the terminal device through different beams.

Figure 1:
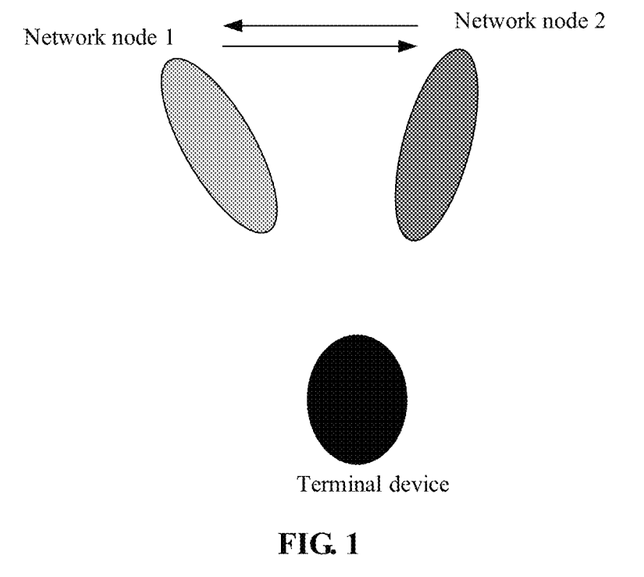
FIG. 1 is a schematic diagram of interaction between devices in a communication system according to an embodiment of the application.

Optionally, in the embodiments of the application, as shown in FIG. 1, multiple network nodes may perform information interaction with one another.

Figure 2:
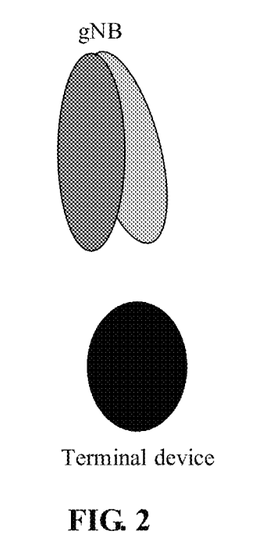
FIG. 2 is a schematic diagram of interaction between devices in a communication system according to an embodiment of the application.

Optionally, in the embodiments of the application, different network nodes may be located in different cells, for example, as shown in FIG. 1; or, different network nodes may be transmission nodes in the same base station (gNB), for example, as shown in FIG. 2.

Optionally, in the embodiments of the application, multiple network nodes may transmit multiple PDCCHs or PDSCHs to a terminal device respectively.

Under this circumstance, the terminal device may receive one control channel only, and the one control channel indicates configuration or scheduling information of the multiple network nodes (in such a case, the control channel transmitted by each network node may carry the configuration or scheduling information about configuration or scheduling of the terminal device by the multiple network nodes).

Or, a terminal device may receive a control channel from each network node, and the each control channel may carry configuration or scheduling information about configuration or scheduling of the terminal device by the respective transmitter only.

Optionally, the terminal device may receive PDCCHs or PDSCHs simultaneously transmitted to the first terminal device by multiple network nodes.

Optionally, a first network node and a second network node may simultaneously transmit the PDCCHs or PDSCHs to the first terminal device through carriers which at least partially overlap in a frequency domain.

Optionally, the first network node and the second network node may perform downlink transmission to the first terminal device through different transmission beams and/or different antenna panels.

Optionally, in the embodiments of the application, the terminal device may perform uplink transmission to the multiple network nodes respectively.

For example, under the circumstance that the terminal device receives the PDCCHs or PDSCHs transmitted by the multiple network nodes, the terminal device may transmit a message to the multiple network nodes respectively.

That is, under the circumstance that there are multiple downlinks, there may be multiple uplinks accordingly.

Information transmitted through the uplinks may include at least one of the following signals:

an Acknowledge (ACK)/Non-Acknowledge (NACK) corresponding to downlink transmission, and corresponding Channel State Information (CSI) or the like, uplink data and a Sounding Reference Signal (SRS).

There are two manners for transmission of multiple uplinks.

A first manner is that: signals of the multiple uplinks are transmitted at different time.

A second manner is that: signals of the multiple uplinks may be transmitted simultaneously.

In the first manner, a network side coordinates to implement, through signaling, transmission of the multiple uplinks in a Time Division Multiplexing (TDM) manner. In the second manner, a method for power control in case of limited power is required to be considered in view of that signals of the multiple uplinks are transmitted simultaneously.

Therefore, how to implement reasonable configuration or scheduling by a network side under the circumstance that multiple uplinks exist is a problem to be solved.

Figure 3:
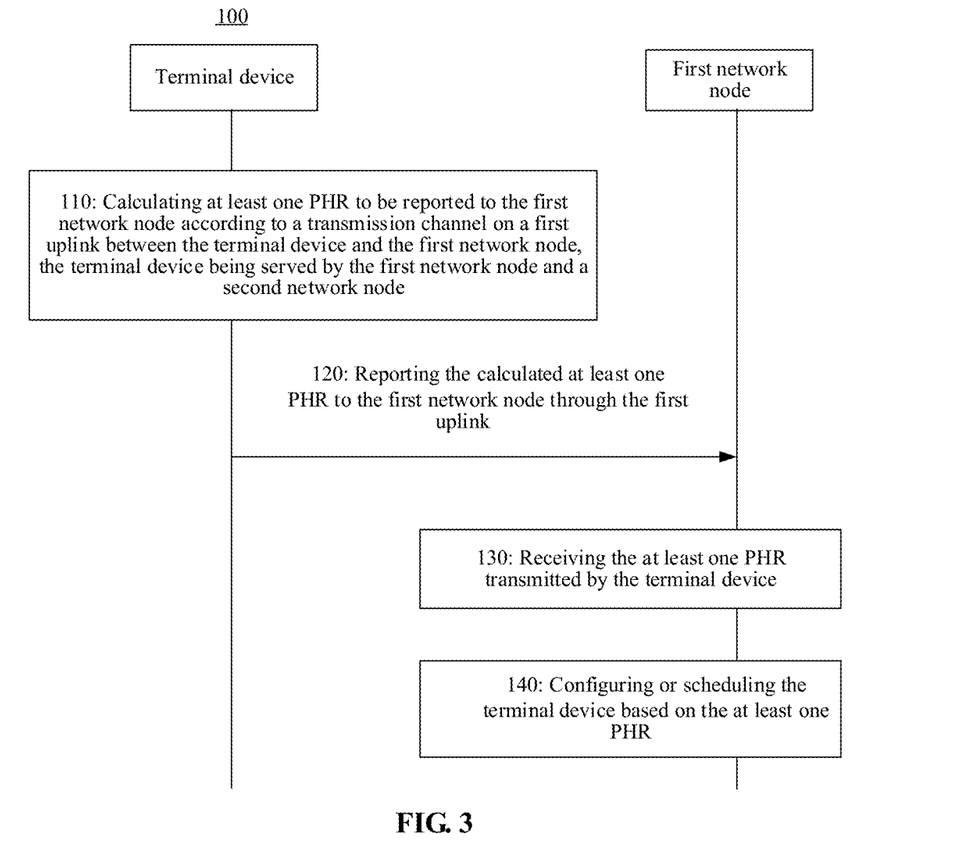
FIG. 3 is a schematic diagram of a method for wireless communication according to an embodiment of the application.

FIG. 3 is a schematic flowchart of a method 100 for wireless communication according to an embodiment of the application. The method 100 includes at least part of contents below.

In 110, a terminal device calculates at least one PHR to be reported to a first network node according to a transmission channel on a first uplink between the terminal device and the first network node; the first network node and a second network node serve the terminal device.

In 120, the terminal device reports the calculated at least one PHR to the first network node through the first uplink.

In 130, the first network node receives the at least one PHR from the terminal device; the at least one PHR is calculated based on the transmission channel on the first uplink between the terminal device and the first network node, and the first network node and the second network node serve the terminal device.

In 140, the first network node configures or schedules the terminal device based on the at least one PHR.

Optionally, a first PHR is calculated by use of the transmission channel on the first uplink without considering a transmission channel on a second uplink between the terminal device and the second network node. The at least one PHR reported to the first network node includes the first PHR.

Optionally, a second PHR is calculated by use of the transmission channel on the first uplink based on the transmission channel on the second uplink between the terminal device and the second network node. The at least one PHR reported to the first network node includes the second PHR.

Optionally, a third PHR is calculated by use of the transmission channel on the second uplink without considering the transmission channel on the first uplink between the terminal device and the first network node, and the third PHR may be reported to the first network node.

Accordingly, in the embodiment of the application, the first network node may receive the first PHR, or receive the second PHR, or receive the third PHR, or receive the first and second PHRs, or receive the first and third PHRs, or receive the second PHR and the third PHR, or receive the first, second and third PHRs.

Optionally, the terminal device may report at least one of the calculated first PHR, second PHR and third PHR to the second network node.

Specifically, the terminal device may report at least one of the first PHR, the second PHR and the third PHR to the second network node through the second uplink.

Optionally, the first network node and the second network node belong to the same cell; or, the first network node and the second network node belong to different cells.

Optionally, in the embodiment of the application, the terminal device may determine the at least one PHR to be reported to the first network node according to a network configuration or preset information.

Optionally, in the embodiment of the application, when a PHR is calculated according to a transmission channel on a link, the PHR may be calculated in consideration of a control channel rather than a data channel of the link, or the PHR is calculated in consideration of no control channel but the data channel of the link, or the PHR is calculated in consideration of both the data channel of the link and the control channel of the link.

Optionally, a network node may schedule the terminal device based on the channel considered when the terminal device calculates the PHR.

For example, when the PHR is calculated, if the terminal device only considers a data channel of a certain link but does not consider a control channel, then the network device, when scheduling the terminal device, also considers whether to schedule the data channel or not without considering the control channel. However, the application is not limited thereto.

Optionally, the at least one PHR to be reported to the first network node may be associated with a communication quality index of a channel between the first network node and the second network node.

Specifically, the embodiment of the application may be applied to the following four scenarios.

A first scenario is that: multiple network nodes belong to the same cell, and backhauls between the network nodes are ideal, namely fast information interaction and dynamic information interaction can be implemented.

A second scenario is that: multiple network nodes belong to the same cell, and backhauls between the network nodes are non-ideal, namely the network nodes cannot implement fast information interaction with one another and can carry out slower data interaction only.

A third scenario is that: multiple network nodes belong to different cells, and backhauls between the network nodes are ideal.

A fourth scenario is that: multiple network nodes belong to different cells, and backhauls between the network nodes are non-ideal.

For the four scenarios, PHRs to be reported may be different.

For example, in the scenarios where quality of the backhauls between the network nodes are relatively poor, the first PHR and the second PHR, or the first PHR and the third PHR, or the PHR may be reported to the first network node.

For example, in the scenarios where the quality of the backhauls between the network nodes are relatively high, the first network node may be provided with the first PHR only.

Optionally, in the embodiment of the application, a quality index of a communication link between the first network node and the second network node may include at least one of capacity, delay and reliability.

Optionally, the communication quality index may include link capacity and/or delay and/or reliability.

Optionally, in the embodiment of the application, the specific PHR to be reported to the network node by the terminal device may be preset in the terminal device, or configured for the terminal device by a network device, for example, configured for the terminal device by the network device based on the link quality between the nodes.

For convenient understanding, the application will be described below based on some embodiments.

Embodiment 1

UE calculates a PHR 1 based on a transmission channel (a control channel and/or a data channel) on an uplink 1. The UE calculates a PHR 2 based on a transmission channel (a control channel and/or a data channel) on an uplink 2.

The UE reports the PHR 1 to a network node 1 through the uplink 1, and the UE reports the PHR 2 to a network node 2 through the uplink 2.

According to embodiment 1, reporting can be reduced. The implementation mode in embodiment 1 is more applicable to uplink transmission of the UE in a TDM manner on multiple uplinks.

Embodiment 2

UE calculates a PHR 1 based on a transmission channel (a control channel and/or a data channel) on an uplink 1. The UE calculates a PHR 2 based on a transmission channel (a control channel and/or a data channel) on an uplink 2.

There are several manners for reporting the PHRs, including that:

the UE reports the PHR 1 and the PHR 2 to a network node 1 through the uplink 1, and/or the UE reports the PHR 1 and the PHR 2 to a network node 2 through the uplink 2; or, the UE reports the PHR 1 and the PHR 2 to the network node 1 through the uplink 1, and the UE reports the PHR 2 to the network node 2 through the uplink 2; or, the UE reports the PHR 1 to the network node 1 through the uplink 1, and the UE reports the PHR 1 and the PHR 2 to the network node 2 through the uplink 2.

Embodiment 3

UE calculates a PHR 1 based on a transmission channel (a control channel and/or a data channel) on an uplink 1. The UE calculates a PHR 2 based on a transmission channel (a control channel and/or a data channel) on an uplink 2. The UE calculates a PHR 3 based on the transmission channel (the control channel and/or the data channel) on the uplink 1 and the transmission channel (the control channel and/or the data channel) on the uplink 2.

A manner for reporting the PHRs includes the following possible options:

the UE reports the PHR 1, the PHR 2 and the PHR 3 to a network node 1 through the uplink 1, and/or the UE reports the PHR 1, the PHR 2 and the PHR 3 to a network node 2 through the uplink 2; or, the UE reports the PHR 1 and the PHR 3 to the network node 1 through the uplink 1, and the UE reports the PHR 2 and the PHR 3 to the network node 2 through the uplink 2; or, the UE reports the PHR 1 and the PHR 3 to the network node 1 through the uplink 1, and the UE reports the PHR 2 to the network node 2 through the uplink 2; or, the UE reports the PHR 1 to the network node 1 through the uplink 1, and the UE reports the PHR 2 and the PHR 3 to the network node 2 through the uplink 2.

For embodiment 2 and embodiment 3, a network (in a scenario where a backhauls between TRPs/beams/cells is non-ideal) may determine whether the UE can transmit signals of two uplinks simultaneously or not according to multiple PHRs reported by the UE. If the UE can, the UE may be configured or scheduled by the network to perform uplink transmission simultaneously on multiple links, so that the efficiency of resource utilization can be improved. If simultaneous transmission of the signals of the two uplinks cannot be supported by power of the UE, the network may configure or schedule the UE to transmit the signal of one uplink every time.

Optionally, in the embodiment of the application, the first network node, after receiving the PHR reported by the terminal device, may schedule the terminal device according to the PHR.

For example, the terminal device reports the second PHR to the first network node, and if the second PHR indicates that the terminal device can perform uplink transmission simultaneously by use of the first link and the second link, then the first network node may directly schedule the terminal device without negotiating with the second network node.

For example, the terminal device reports the second PHR to the first network node, and if the second PHR indicates that the terminal device cannot perform uplink transmission simultaneously by use of the first link and the second link, then the first network node may negotiate with the second network node to schedule the terminal device.

For example, the terminal device reports the first PHR and the third PHR to the first network node, and if the first PHR and the third PHR represent relatively high surplus power respectively, then the first network node and the second network node may negotiate about simultaneous uplink transmission of the UE on multiple links.

It is also to be understood that, in the embodiment of the application, although descriptions are made with the first uplink and the second uplink as an example, it does not mean that only two uplinks are transmitted simultaneously. For example, the first uplink may include multiple uplinks, or the second uplink may include multiple uplinks, or, a third uplink may also exist.

Optionally, the first network node may communicate with the terminal device through a first carrier, and the second network node may communicate with the terminal device through a second carrier. In such a case, the terminal device communicates with the network device through multiple carriers, and this scenario may be a scenario of dual connectivity, for example, a scenario of LTE-NR dual connectivity.

Optionally, the first network node and the second network node may be physically independent nodes; or, the first network node and the second network node may be implemented through the same physical node.

Optionally, the first carrier may be a carrier in a first carrier group, and the second carrier may be a carrier in a second carrier group that is not the first carrier group. For example, the first carrier group is a primary carrier group, and the second carrier group is a secondary carrier group. Or, the first carrier group is a secondary carrier group, and the second carrier group is a primary carrier group.

Optionally, the first carrier is a carrier of a communication system adopting a first communication mode, and the second carrier is a carrier of a communication system adopting a second communication mode that is not the first communication mode.

Optionally, the first communication mode may be an LTE communication mode, and the second communication mode may be an NR communication mode; or the first communication mode may be the NR communication mode, and the second communication mode may be the LTE communication mode. The first communication mode and the second communication mode may also be other different communication modes.

Optionally, the first carrier and the second carrier may completely or partially overlap with each other in a frequency domain.

Accordingly, in the embodiment of the application, the terminal device reports a PHR corresponding to at least one link to at least one network node under the condition that multiple uplinks exist, and then the network node may configure or schedule the terminal device based on the PHR corresponding to the link. Therefore, the terminal device may be reasonably configured or scheduled, and system performance may be improved.

Figure 4:
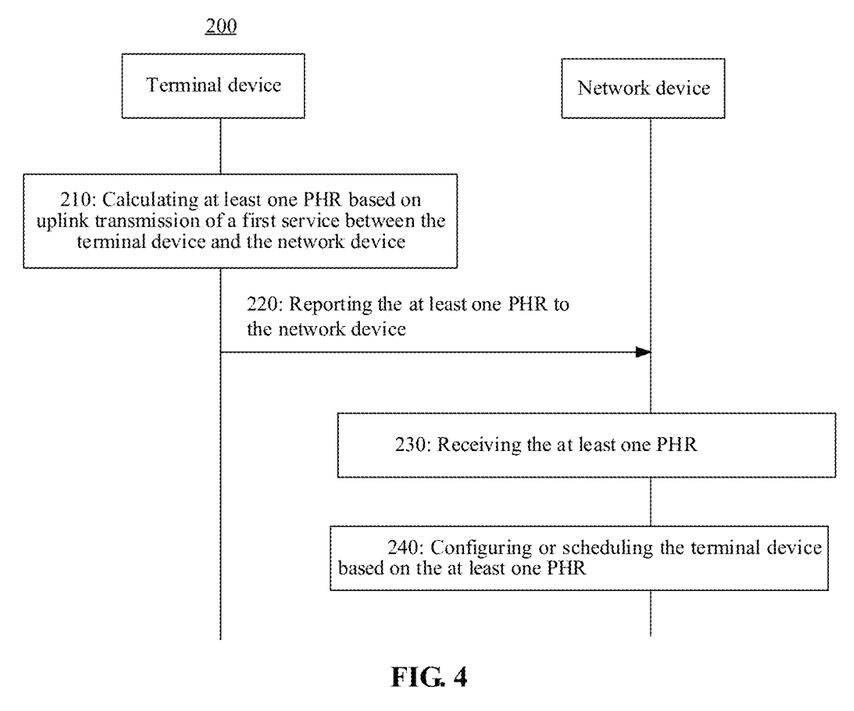
FIG. 4 is a schematic diagram of a method for wireless communication according to an embodiment of the application.

FIG. 4 is a schematic flowchart of a method 200 for wireless communication according to an embodiment of the application. The method 200 includes at least part of contents below.

In 210, a terminal device calculates at least one PHR based on uplink transmission of a first service between the terminal device and a network device.

In 220, the terminal device reports the at least one PHR to the network device.

In 230, the network device receives the at least one PHR calculated by the terminal device based on uplink transmission of the first service between the terminal device and the network device.

In 240, the network device configures or schedules the terminal device based on the at least one PHR.

Optionally, the terminal device may calculate a first PHR based on uplink transmission of the first service without considering uplink transmission of a second service. The at least one PHR reported to the network device by the terminal device includes the first PHR.

Optionally, the terminal device may calculate a second PHR based on uplink transmission of the first service in combination with uplink transmission of the second service. The at least one PHR reported to the network device by the terminal device includes the second PHR.

Optionally, the terminal device may calculate a third PHR based on uplink transmission of the second service without considering uplink transmission of the first service. The PHR reported to the network device by the terminal device includes the third PHR.

Optionally, a PHR calculated by the terminal device based on uplink transmission of one or more services may refer to a PHR obtained by the terminal device when the one or more services are transmitted (other uplink transmission is not performed).

Optionally, in the embodiment of the application, a first network node, after receiving the PHR reported by the terminal device, may configure or schedule the terminal device according to the PHR.

For example, the terminal device reports the first PHR to the network device, and if the first PHR indicates that the terminal device still has relatively high surplus power after the terminal device transmits the first service, the network device may configure or schedule the terminal device to transmit the second service simultaneously.

For example, the terminal device reports the first PHR to the network device, and if the first PHR indicates that the terminal device has no enough power for transmission of other services after the terminal device transmits the first service, the network device may configure or schedule the terminal device to transmit the second service at a time different from the time of transmission of the first service.

For example, the terminal device reports the second PHR to the network device, and if the second PHR indicates that the power of the terminal device is not enough for simultaneous transmission of the first service and the second service, the network device may configure or schedule the terminal device to transmit the first service and the second service at different time.

Optionally, the first service may be a Ultra-Reliable Low Latency Communications (URLLC) service, and the second service may be an Enhanced Mobile Broadband (eMBB) service.

It is also to be understood that, in the embodiment of the application, although descriptions are made with the first service and the second service as an example, it does not mean that only two services are transmitted simultaneously. For example, the first service may include multiple services, or the second service may include multiple services, or, a third service or the like may also exist.

Optionally, the network node in the method 100 may have a function of the network device in the method 200, or, the network device in the method 200 may have a function of the network node in the method 100.

Accordingly, in the embodiment of the application, the terminal device reports a PHR corresponding to at least one service to at least the network device under the condition that multiple services exist, and then the network device may configure or schedule the terminal device based on the PHR corresponding to the service. Therefore, the terminal device may be reasonably configured or scheduled, and system performance may be improved.

Figure 5:
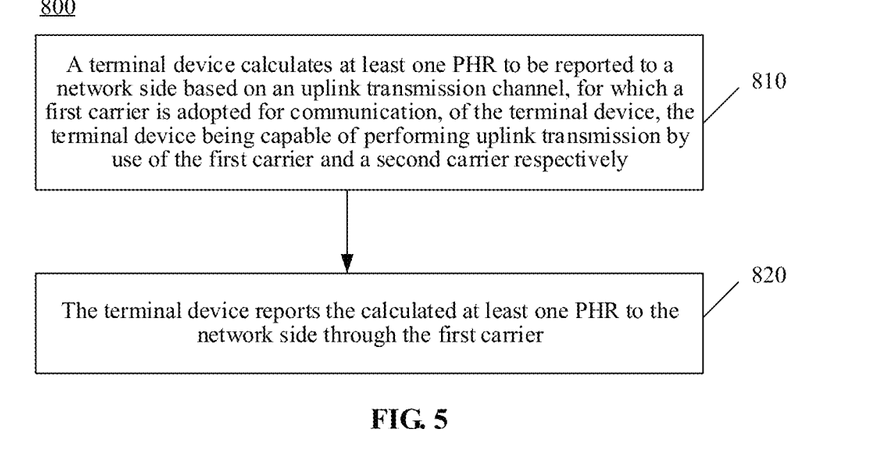
FIG. 5 is a schematic diagram of a method for wireless communication according to an embodiment of the application.

FIG. 5 is a schematic flowchart of a method 800 for wireless communication according to an embodiment of the application. The method 800 includes at least part of contents below.

In 810, a terminal device calculates at least one PHR needed to be reported to a network side based on an uplink transmission channel, for which a first carrier is adopted for communication, of the terminal device; the terminal device is capable of performing uplink transmission by use of the first carrier and a second carrier respectively.

In such a case, the terminal device communicates with a network device through multiple carriers, and this scenario may be a dual connectivity scenario, for example, an LTE-NR dual connectivity scenario.

In 820, the terminal device reports the calculated at least one PHR to the network side through the first carrier.

Optionally, a first PHR may be calculated based on the uplink transmission channel, for which the first carrier is adopted for communication, of the terminal device without considering an uplink transmission channel, for which the second carrier is adopted for communication, of the terminal device. The at least one PHR reported to the network side includes the first PHR.

Optionally, the terminal device may report the calculated first PHR to the network side through the second carrier.

Optionally, a second PHR may be calculated based on the uplink transmission channel, for which the first carrier is adopted for communication, of the terminal device in combination with the uplink transmission channel, for which the second carrier is adopted for communication, of the terminal device. The at least one PHR reported to the network side includes the second PHR.

Optionally, the terminal device may report the calculated second PHR to the network side through the second carrier.

Optionally, a third PHR may be calculated based on the uplink transmission channel, for which the second carrier is adopted for communication, of the terminal device without considering the uplink transmission channel, for which the first carrier is adopted for communication, of the terminal device. The terminal device reports the calculated third PHR to the network side through the second carrier, or the terminal device reports the calculated third PHR to the network side through the first carrier.

Optionally, the terminal device may receive PDCCHs or PDSCHs simultaneously transmitted through the first carrier and the second carrier to the terminal device by the network side.

Optionally, the terminal device may determine the PHR to be reported through the first carrier according to a network configuration or preset information.

Optionally, the first carrier may be a carrier in a first carrier group, and the second carrier may be a carrier in a second carrier group that is not the first carrier group.

Optionally, the first carrier may be a carrier of a communication system adopting a first communication mode, and the second carrier may be a carrier of a communication system adopting a second communication mode that is not the first communication mode.

Optionally, the first communication mode may be an LTE communication mode, and the second communication mode may be an NR communication mode; or the first communication mode may be the NR communication mode, and the second communication mode may be the LTE communication mode.

Optionally, the first carrier and the second carrier may completely or partially overlap with each other in a frequency domain.

Figure 6:
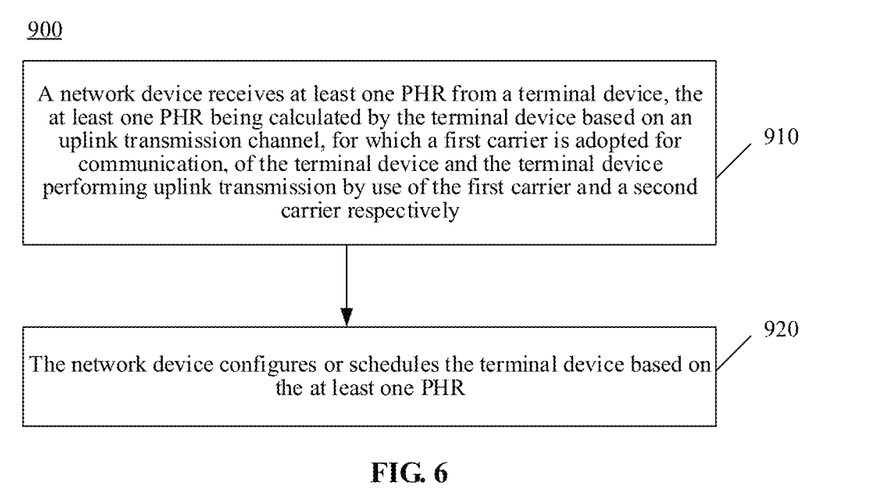
FIG. 6 is a schematic diagram of a method for wireless communication according to an embodiment of the application.

FIG. 6 is a schematic flowchart of a method 900 for wireless communication according to an embodiment of the application. The method 900 includes at least part of contents below.

In 910, a network device receives at least one PHR from a terminal device; the at least one PHR is calculated by the terminal device based on an uplink transmission channel, for which a first carrier is adopted for communication, of the terminal device, and the terminal device performs uplink transmission by use of the first carrier and a second carrier respectively.

In such a case, the terminal device communicates with the network device through multiple carriers, and this scenario may be a dual connectivity scenario, for example, an LTE-NR dual connectivity scenario.

In 920, the network device configures or schedules the terminal device based on the at least one PHR.

Optionally, the at least one PHR may include a first PHR, and the first PHR is calculated based on the uplink transmission channel, for which the first carrier is adopted for communication, of the terminal device without considering an uplink transmission channel, for which the second carrier is adopted for communication, of the terminal device.

Optionally, the at least one PHR may include a second PHR, and the second PHR is calculated based on the uplink transmission channel, for which the first carrier is adopted for communication, of the terminal device and in combination with the uplink transmission channel, for which the second carrier is adopted for communication, of the terminal device.

Optionally, the network device may receive a third PHR transmitted by the terminal device, and the third PHR is calculated based on the uplink transmission channel, for which the second carrier is adopted for communication, of the terminal device without considering the uplink transmission channel, for which the first carrier is adopted for communication, of the terminal device. The network device configures or schedules the terminal device based on the at least one PHR and the third PHR.

Optionally, the first carrier may be a carrier in a first carrier group, and the second carrier may be a carrier in a second carrier group that is not the first carrier group.

Optionally, the first carrier may be a carrier of a communication system adopting a first communication mode, and the second carrier may be a carrier of a communication system adopting a second communication mode that is not the first communication mode.

Optionally, the first communication mode may be an LTE communication mode, and the second communication mode may be an NR communication mode; or the first communication mode may be the NR communication mode, and the second communication mode may be the LTE communication mode.

Optionally, the first carrier and the second carrier may completely or partially overlap with one another in a frequency domain.

It is to be understood that the descriptions about each method in the embodiments of the application may refer to one another without conflicts and each method in the embodiments of the application may be combined for use without conflicts.

Figure 7:
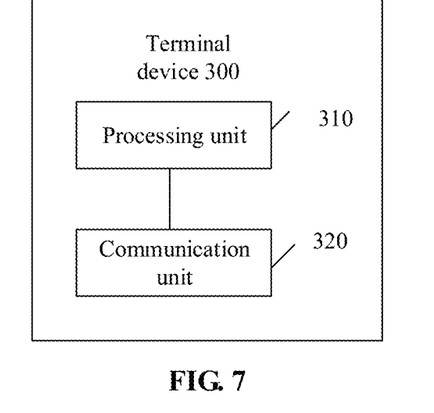
FIG. 7 is a schematic block diagram of a terminal device according to an embodiment of the application.

FIG. 7 is a schematic block diagram of a terminal device 300 according to an embodiment of the application. As shown in FIG. 7, the terminal device 300 includes a processing unit 310 and a communication unit 320.

The processing unit 310 is configured to calculate at least one PHR to be reported to a first network node based on a transmission channel on a first uplink between the terminal device and the first network node; the first network node and a second network node serve the terminal device. The communication unit 320 is configured to report the calculated at least one PHR to the first network node through the first uplink.

It is to be understood that the terminal device 300 may correspond to the terminal device in the method 100, may execute corresponding operations executed by the terminal device in the method 100 and, for simplicity, will not be elaborated herein.

Optionally, the processing unit 310 is configured to calculate at least one PHR based on uplink transmission of a first service between the terminal device and a network device. The communication unit 320 is configured to report the at least one PHR to the network device.

It is to be understood that the terminal device 300 may correspond to the terminal device in the method 200, may execute corresponding operations executed by the terminal device in the method 200 and, for simplicity, will not be elaborated herein.

Optionally, the processing unit 310 is configured to calculate at least one PHR to be reported to a network side based on an uplink transmission channel, for which a first carrier is adopted for communication, of the terminal device, the terminal device being capable of performing uplink transmission by use of the first carrier and a second carrier respectively.

The communication unit 320 is configured to report the calculated at least one PHR to the network side through the first carrier.

It is to be understood that the terminal device 300 may correspond to the terminal device in the method 800, may execute corresponding operations executed by the terminal device in the method 800 and, for simplicity, will not be elaborated herein.

Figure 8:
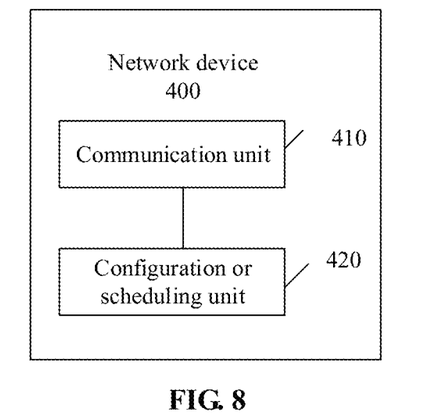
FIG. 8 is a schematic block diagram of a network node according to an embodiment of the application.

FIG. 8 is a schematic block diagram of a network node 400 according to an embodiment of the application. As shown in FIG. 8, the network node 400 includes a communication unit 410 and a configuration or scheduling unit 420.

The communication unit 410 is configured to receive at least one PHR transmitted by a terminal device; the at least one PHR is calculated based on a transmission channel on a first uplink between the terminal device and the first network node, and the first network node and the second network node serve the terminal device. The configuration or scheduling unit 420 is configured to configure or schedule the terminal device based on the at least one PHR.

It is to be understood that the network node 400 may correspond to the first network node in the method 100, may implement corresponding operations of the first network node in the method 100 and, for simplicity, will not be elaborated herein.

Figure 9:
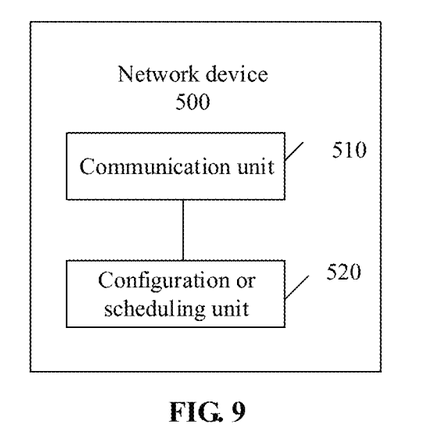
FIG. 9 is a schematic block diagram of a network device according to an embodiment of the application.

FIG. 9 is a schematic block diagram of a network device 500 according to an embodiment of the application. As shown in FIG. 9, the network device 500 includes a communication unit 510 and a configuration or scheduling unit 520.

The communication unit 510 is configured to receive at least one PHR calculated by a terminal device based on uplink transmission of a first service between the terminal device and the network device.

The configuration or scheduling unit 520 is configured to configure or schedule the terminal device based on the at least one PHR.

It is to be understood that the network device 500 may correspond to the network device in the method 200, may implement corresponding operations of the network device in the method 200 and, for simplicity, will not be elaborated herein.

Optionally, the communication unit 510 is configured to receive at least one PHR transmitted by a terminal device; the at least one PHR is calculated by the terminal device based on an uplink transmission channel, for which a first carrier is adopted for communication, of the terminal device, and the terminal device perform uplink transmission by use of the first carrier and a second carrier respectively.

The configuration or scheduling unit 520 is configured to configure or schedule the terminal device based on the at least one PHR.

It is to be understood that the network device 500 may correspond to the network device in the method 900, may implement corresponding operations of the network device in the method 900 and, for simplicity, will not be elaborated herein.

Figure 10:
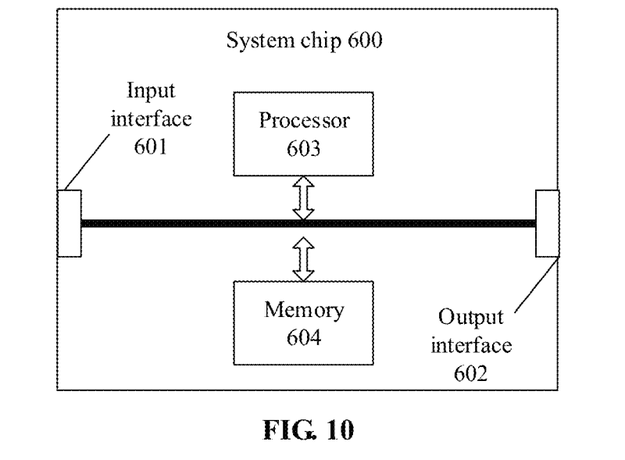
FIG. 10 is a schematic block diagram of a system chip according to an embodiment of the application.

FIG. 10 is a schematic structure diagram of a system chip 600 according to an embodiment of the application. The system chip 600 of FIG. 10 includes an input interface 601, an output interface 602, a processor 603 and a memory 604, which may be connected with each other through internal communication connecting lines. The processor 603 is configured to execute a code in the memory 604.

Optionally, when the code is executed, the processor 503 implements the methods executed by the network device or by the terminal device or by the network node in the method embodiments. For simplicity, elaborations are omitted herein.

Figure 11:
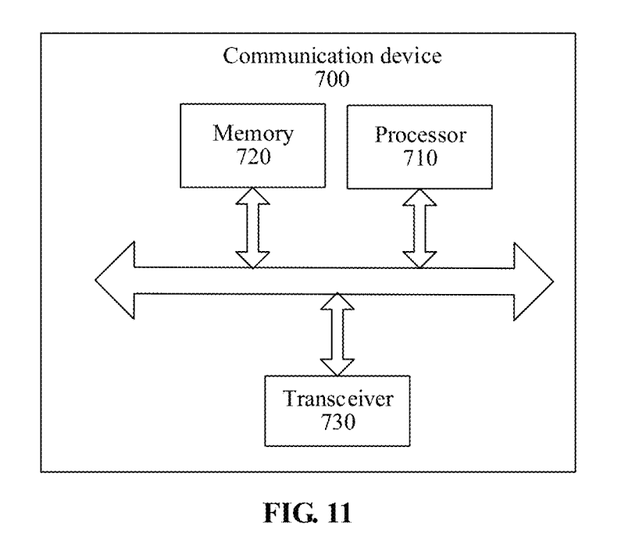
FIG. 11 is a schematic block diagram of a communication device according to an embodiment of the application.

FIG. 11 is a schematic block diagram of a communication device 700 according to an embodiment of the application. As shown in FIG. 11, the communication device 700 includes a processor 710 and a memory 720. Herein, the memory 720 may store a program code, and the processor 710 may execute the program code stored in the memory 720.

Optionally, as shown in FIG. 11, the communication device 700 may include a transceiver 730, and the processor 710 may control the transceiver 730 for external communication.

Optionally, the processor 710 may call a program code stored in the memory 720 to execute corresponding operations executed by a network device or a terminal device or a network node in the method embodiments. For similarity, elaborations are omitted herein.

The method embodiments in the embodiments of the application may be applied to a processor or implemented by the processor. The processor may be an integrated circuit chip with a capability of signal processing. In an implementation process, each step of the method embodiments may be completed by an integrated logical circuit of hardware in the processor or an instruction in a software form. The processor may be a universal processor, a Digital Signal Processor (DSP), an Application Specific Integrated Circuit (ASIC), a Field Programmable Gate Array (FPGA) or other programmable logical devices, a transistor logical device and a discrete hardware component. Each method, step and logical block diagram in the embodiments of the application may be implemented or executed. The universal processor may be a microprocessor or the processor may also be any conventional processor and the like. The steps of the method described based on the embodiments of the application may be directly embodied to be executed and completed by a hardware decoding processor or executed and completed by a combination of hardware and software modules in the decoding processor. The software module may be located in a mature storage medium in this field such as a Random Access Memory (RAM), a flash memory, a Read-Only Memory (ROM), a Programmable ROM (PROM) or Electrically Erasable PROM (EEPROM) and a register. The storage medium is located in a memory, and the processor reads information from the memory, and completes the steps of the methods in combination with hardware.

It may be understood that the memory in the embodiment of the application may be a volatile memory or a nonvolatile memory, or may include both the volatile and nonvolatile memories. The nonvolatile memory may be a ROM, a PROM, an Erasable PROM (EPROM), an EEPROM or a flash memory. The volatile memory may be a RAM, and may be used as an external high-speed cache. It is exemplarily but unlimitedly described that various types of RAMs may be adopted, such as a Static RAM (SRAM), a Dynamic RAM (DRAM), a Synchronous DRAM (SDRAM), a RAM Double Data Rate SDRAM (DDRSDRAM), an Enhanced SDRAM (ESDRAM), a Synchlink DRAM (SLDRAM) and a Direct Rambus RAM (DR RAM). It is to be noted that the memory of a system and method described in the disclosure is intended to include, but not limited to, memories of these and any other proper types.

It is finally to be noted that terminologies used in the embodiments and appended claims of the application are only for the purpose of describing the specific embodiments and not intended to limit the embodiments of the application.

For example, singular forms "a/an", "said" and "the" used in the embodiments and appended claims of the application are intended to further include plural forms unless other meanings are clearly expressed in the context.

For another example, terminologies such as first-type cell group and second-type cell group may be adopted in the embodiments of the application, but cell groups of these types are not limited to these terminologies. The terminologies are adopted to distinguish various types of cell groups only.

For another example, based on the context, terminology "while" used here may be explained as "if" or "in case of" or "when" or "responsive to determining" or "responsive to detecting". Similarly, based on the context, the phrase "if it is determined" or "if it is detected (plus a stated condition or event)" may be interpreted as "when determining" or "responsive to determining" or "when detecting (plus a stated condition or event)" or "responsive to detecting (plus a stated condition or event)".

Those of ordinary skill in the art may realize that the units and algorithm steps of each example described in combination with the embodiments in the disclosure may be implemented by electronic hardware or a combination of computer software and the electronic hardware. Whether these functions are executed in a hardware or software manner depends on specific applications and design constraints of the technical solutions. Professionals may realize the described functions for each specific application by use of different methods, but such realization shall fall within the scope of the embodiments of the application.

Those skilled in the art may clearly learn about that specific working processes of the system, device and unit described above may refer to the corresponding processes in the method embodiment and will not be elaborated herein for convenient and brief description.

In some embodiments provided by the application, it is to be understood that the disclosed system, device and method may be implemented in another manner. For example, the device embodiment described above is only schematic, and for example, division of the units is only logic function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical and mechanical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the embodiments of the application according to a practical requirement.

In addition, each function unit in the embodiments of the application may be integrated into a processing unit, each unit may also exist independently, and two or more than two units may also be integrated into a unit.

When being realized in form of software functional unit and sold or used as an independent product, the function may also be stored in a computer-readable storage medium. Based on such an understanding, the technical solutions of the embodiments of the application substantially or the parts making contributions to the conventional art or part of the technical solutions may be embodied in form of software product, and the computer software product is stored in a storage medium, including a plurality of instructions configured to enable a computer device (which may be a personal computer, a server, a network device or the like) to execute all or part of the steps of the method in the embodiments of the application. The abovementioned storage medium includes: various media capable of storing program codes such as a U disk, a mobile hard disk, a ROM, a RAM, a magnetic disk or an optical disk.

The above is only the specific implementation mode of the embodiments of the application and not intended to limit the scope of protection of the embodiments of the application. Any variations or replacements apparent to those skilled in the art within the technical scope disclosed by the embodiments of the application shall fall within the scope of protection of the embodiments of the application. Therefore, the scope of protection of the embodiments of the application shall be subject to the scope of protection of the claims.

What is claimed is:

1. A method for wireless communication, comprising:
   calculating, by a terminal device, at least one Power Headroom Report (PHR) to be reported to a first network node based on a transmission channel on a first uplink between the terminal device and the first network node, wherein the terminal device is served by the first network node and a second network node; and
   reporting, by the terminal device, the calculated at least one PHR to the first network node through the first uplink,
   wherein the at least one PHR to be reported to the first network node is associated with a communication quality index of a channel between the first network node and the second network node.

2. The method of claim 1, wherein the first network node communicates with the terminal device through a first carrier, and the second network node communicates with the terminal device through a second carrier.

3. The method of claim 2, wherein the first carrier is a carrier in a first carrier group, and the second carrier is a carrier in a second carrier group that is not the first carrier group; or,
   the first carrier is a carrier of a communication system adopting a first communication mode, and the second carrier is a carrier of a communication system adopting a second communication mode that is not the first communication mode.

4. The method of claim 3, wherein
   the first communication mode is a Long Term Evolution (LTE) communication mode, and the second communication mode is a New Radio (NR) communication mode; or
   the first communication mode is an NR communication mode, and the second communication mode is an LTE communication mode.

5. The method of claim 4, wherein the first carrier and the second carrier completely or partially overlap in a frequency domain.

6. A terminal device, comprising a processor and a transceiver, wherein
   the processor is configured to calculate at least one Power Headroom Report (PHR) to be reported to a first network node based on a transmission channel on a first uplink between the terminal device and the first network node, the terminal device being served by the first network node and a second network; and
   the transceiver is configured to report the calculated at least one PHR to the first network node through the first uplink,
   wherein the at least one PHR to be reported to the first network node is associated with a communication quality index of a channel between the first network node and the second network node.

7. The terminal device of claim 6, wherein the processor is further configured to:
   calculate a first PHR by use of the transmission channel on the first uplink without considering a transmission channel on a second uplink between the terminal device and the second network node,
   wherein the at least one PHR reported to the first network node by the transceiver comprises the first PHR.

8. The terminal device of claim 7, wherein the transceiver is further configured to:
   report the calculated first PHR to the second network node through the second uplink.

9. The terminal device of claim 6, wherein the processor is further configured to:
   calculate a second PHR by use of the transmission channel on the first uplink and in combination with a transmission channel on a second uplink between the terminal device and the second network node,
   wherein the at least one PHR reported to the first network node by the transceiver comprises the second PHR.

10. The terminal device of claim 9, wherein the transceiver is further configured to:
    report the calculated second PHR to the second network node through the second uplink.

11. The terminal device of claim 6, wherein
    the processor is further configured to:
    calculate a third PHR by use of a transmission channel on a second uplink without considering the transmission channel on the first uplink between the terminal device and the first network node; and
    the transceiver is further configured to:
    report the calculated third PHR to the second network node through the second uplink, or
    report the calculated third PHR to the first network node through the first uplink.

12. The terminal device of claim 6, wherein the transceiver is further configured to:
    receive Physical Downlink Control Channels (PDCCHs) or Physical Downlink Shared Channels (PDSCHs) simultaneously transmitted to the terminal device by the first network node and the second network node.

13. The terminal device of claim 6, wherein the processor is further configured to:
   determine the at least one PHR to be reported to the first network node according to a network configuration or preset information.

* * * * *